(12) United States Patent
Krumme

(10) Patent No.: US 6,523,952 B1
(45) Date of Patent: Feb. 25, 2003

(54) EYEGLASS FRAME ASSEMBLY

(75) Inventor: John Krumme, Tahoe City, CA (US)

(73) Assignee: The Beta Group, Inc., Menlo Park, CA (US)

( * ) Notice: Subject to any disclaimer, the term of this patent is extended or adjusted under 35 U.S.C. 154(b) by 0 days.

(21) Appl. No.: 10/138,053

(22) Filed: May 3, 2002

(51) Int. Cl.[7] .................................................. G02C 1/02
(52) U.S. Cl. ........................... 351/110; 351/86; 351/92; 351/106
(58) Field of Search ............................. 351/110, 86, 92, 351/106, 41, 111, 83, 90, 91, 93, 103, 140

(56) References Cited

U.S. PATENT DOCUMENTS 6,164,775 A * 12/2000 Zider et al. .................. 351/86
6,394,599 B1 * 5/2002 Blanvillain ................. 351/110

* cited by examiner

Primary Examiner—Hung Xuan Dang
(74) Attorney, Agent, or Firm—Madson & Metcalf

(57) ABSTRACT

An eyeglass assembly which comprises a lens and a frame member, in which the lens has a lug at one edge. The assembly includes a connector by which the frame member is fastened to the lug. The connector comprises a hoop formed from a shape memory alloy which has (a) been treated so that the hoop shrinks inwardly when it is heated to a temperature at which the alloy transforms from martensite phase to austenite phase, and (b) been exposed to an increase in temperature so that the phase of the alloy changes from the martensite phase to the austenite phase and so that the connector hoop shrinks inwardly to grip the lens lug.

14 Claims, 6 Drawing Sheets

EYEGLASS FRAME ASSEMBLY

BACKGROUND OF THE INVENTION

This invention relates to an eyeglass assembly which comprises a lens and a frame member, and to a method of assembling an eyeglass.

An eyeglass will comprise frame components and lens components. It will generally include two lenses (although it might include just one). An eyeglass which includes two lenses will generally include, as frame components, a nose bridge by which the two lenses are connected to one another, and temples which extend from the lenses to fit against the user's ears. The present invention is concerned with fastening frame components and lens components together.

It is known from U.S. Pat. No. 6,164,775 to fasten frame components to the lens of an eyeglass using lugs which are formed on the edge of the lens. The frame components are formed with a gripping portion which includes a pair of gripping arms. The configuration of the gripping portion can change between an open configuration in which the arms are spaced apart, and a closed configuration in which the arms grip the lug. The gripping portion can be formed from a shape memory alloy. Articles formed from shape memory alloys can exhibit shape memory properties associated with transformations between martensite and austenite phases of the alloys. These properties include thermally induced changes in configuration in which an article is first deformed from a heat-stable configuration to a heat-unstable configuration while the alloy is in its martensite phase. Subsequent exposure to increased temperature results in a change in configuration from the heat-unstable configuration towards the original heat-stable configuration as the alloy reverts from its martensite phase to its austenite phase. The transformation from austenite to martensite on cooling begins at a temperature known as the $M_s$ temperature, and is completed at a temperature known as the $M_f$ temperature. The transformation of martensite to austenite upon heating begins at a temperature known as the $A_s$ temperature and is complete at or above a temperature known as the $A_f$ temperature. Shape memory alloys are discussed in an article by L McDonald Schetky in the Encyclopedia of Chemical Technology (edited by Kirk-Othmer), volume 20 pages 726 to 736.

SUMMARY OF THE INVENTION

The present invention provides an eyeglass assembly in which a frame component is attached to a lens using a connector having a hoop configuration which is formed from a shape memory alloy.

Accordingly, in one aspect, the invention provides an eyeglass assembly which comprises a lens and a frame member, in which the lens has a lug at one edge, and which includes a connector by which the frame member is fastened to the lug, the connector comprising a hoop formed from a shape memory alloy which has (a) been treated so that the hoop shrinks inwardly when it is heated to a temperature at which the alloy transforms from martensite phase to austenite phase, and (b) been exposed to an increase in temperature so that the phase of the alloy changes from the martensite phase to the austenite phase and so that the connector hoop shrinks inwardly to grip the lens lug.

In another aspect, the invention provides a method of assembling an eyeglass which comprises a frame member and a lens in which the lens has a lug at an edge thereof and in which the frame member is fastened to the lens by means of a connector which comprises a hoop formed from a shape memory alloy which has been treated so that the hoop shrinks inwardly when it is heated to a temperature at which the alloy transforms from martensite phase to austenite phase, in which the method comprises the steps of:

a. positioning the connector in relation to the lens lug so that the lug is located within the connector hoop, and b. causing the temperature of the alloy to increase so that the phase of the alloy changes from the martensite phase to the austenite phase and so that the connector hoop shrinks inwardly to grip the lens lug.

The present invention provides a technique for assembling an eyeglass frame which can be secure. The use of a connector with a hoop configuration has the advantage of providing a generally uniform distribution of stress across the cross-section of the connector. The stress in the connector primarily involves the connector being in tension. The stress distribution is more uniform than can be obtained with a connector which makes use of a pair of gripping arms which bend relative to one another between open and closed configurations; in this form of connector, the stress in the connector arises primarily from bending of the arms. The strength of the connection between the frame and lens of the eyeglass is dependent on the stress that is imposed by the connector on the lens lug. The hoop connector that is used in the present invention facilitates the imposition of higher stresses on the lens lug compared with the stresses which can be imposed using a connector comprising a pair of gripping arms. The use of a hoop connector therefore facilitates the formation of secure connections between the lens and a frame component of an eyeglass using connectors of small size.

The frame member and the connector can be connected to one another prior to the connector hoop is made to shrink inwardly. For example, the frame member and the connector can be formed from a common substrate, or the frame member and the connector can be connected to one another by bonding, for example by welding or soldering or brazing or by means of an adhesive. Use of a connector and frame member which are connected to one another (whether as a result of connection prior to shrinkage of the connector or by being formed from a common substrate) has the advantage that the number of components to be manipulated during assembly is reduced.

The connector and the frame member can be assembled with the lens as separate components. The frame member and the lug on the lens can then be fastened together by locating them within the connector hoop before it is heated to cause it to shrink inwardly. The lug on the lens can be configured so that it and the end of the frame member can fit together within the connector hoop. For example, the lug can be rounded with a convex shape at one end, and include a concave recessed portion at its other end in which the end of the frame member can be received.

Providing the connector and the frame member as separate components, whether or not they are fastened together prior to assembly of the eyeglass, has the advantage of allowing different materials to be used for the connector and the frame member, and use of components with different shapes or configurations etc. For example, it might be preferred for the connector to be made from a piece of extruded tube and for the frame member to be made from a piece of wire or rod.

It can be preferred for the frame member to be formed, at least in part, from a piece of tube. The tube might be extruded as such, or machined from a solid piece of the alloy. When the frame member is formed from a piece of tube, the connector hoop can be provided by an end portion of the tube.

When the frame member is formed from a piece of tube, the assembly can include a reinforcing insert for location within the tube of the frame member to reinforce it against bending. The insert can also control the shape of the frame member, for example in terms of its cross-sectional shape and also the overall shape (for example as to whether it is curved or straight). For example, an insert with a rectangular cross-section can be used within a tube whose cross-section is not rectangular so that, when the tube shrinks inwardly, on to the insert, the tube adopts a rectangular cross-section. An insert which is curved, for example arched, can cause a tubular frame member to adopt an arched configuration.

The insert can be located within the tube before the tube is exposed to an increase in temperature to cause it to shrink inwardly, so that the insert is a loose fit in the tube when placed inside the tube, and is then held snugly within the tube after the tube has been made to shrink.

The insert can be made from a material whose appearance contrasts with that of the tube. It can be preferred for some applications for the wall of the frame member tube to have openings formed in it. The use of a material for the insert whose appearance contrasts with that of the tube can give rise to advantages in terms of providing an aesthetically pleasing appearance.

When the frame member is tubular and has openings in its wall, the insert can be a part of an eyeglass component which is fastened to the frame member as a result of the insert being located within the tube. For example, the eyeglass assembly can include a nose pad which is formed with an insert which can be fitted within the tube of the nose bridge to attach the nose pad to the nose bridge.

Preferably, a transverse dimension of the lug is larger towards its free end compared with that dimension at a point between the free end and the lens body. This has the advantage of increasing the security of the connection between the lens and the frame member. The increase in the transverse dimension is preferably at least about 2%, measured relative to the said dimension at the root of the lug, more preferably at least about 5%. Preferably, the increase in the transverse dimension is not more than about 15%, more preferably not more than about 10%. For example, the lug can include a lip at its free end, extending around at least a part of the periphery of the lug. For example, the lip can be provided in two or more spaced apart regions towards the edge of the lug. Preferably, the lip extends around the entire periphery of the lug. The lug can be flared outwardly towards its free end, at least over a part of its cross-section. For example, when the lug has an elongate cross-section, the width of the lug (measured between the opposite long walls) can remain substantially constant between the root of the lug and its free end, and the height of the lug (measured between the opposite short walls) can increase slightly between the root of the lug and its free end.

The method of the invention can be performed on Ni—Ti based shape memory alloys. Such alloys include binary alloys, such as those in which the nickel content is at least about 50 at. %, preferably at least about 50.5 at. %. The nickel content will usefully be less than about 52 at. %, preferably less than about 51 at. %. The method can also be performed on other Ni—Ti based alloys, including alloys with ternary and quaternary and possibly other additions. Examples of elements that can be incorporated in the alloy include one or more of Cr, Fe, Co, Al, Cu, Nb and Zr. Added elements can be present in amounts up to about 10 at. %, preferably up to about 5 at. %. Alloys which are suitable for this treatment are preferably thermally unstable, meaning that their properties can be altered through thermal ageing after quenching from above the solvus temperature. It is understood that certain alloying additions may cause the specific temperatures cited to change somewhat, and that appropriate corrections be made. Shape memory alloys which other than those based on nickel and titanium can also be used.

Techniques for treating a component so that it exhibits a shape memory effect are well established. They can include combinations of heat treatments and working the alloy. Preferably, the component is treated so that the $A_f$ temperature of the alloy is not more than about 75° C., more preferably not more than about 50° C. Preferably, the $M_s$ temperature of the alloy is not more than about −15° C., more preferably not more than about −25° C. The use of an alloy with an $M_s$ temperature which is below one or both of these limits has the advantage of allowing use of the assembly of the invention in cold temperatures without the connection between the lens and the frame becoming loose. By appropriate selection of the transformation temperatures of the alloy which is used in the assembly of the invention, it can be used in temperatures as low as −15° C., preferably as low as −20° C. It can be used in temperatures as high as 30° C., preferably as high as 40° C.

An example of a technique that can be used to form a connector from a nickel-titanium based alloy involves forming the connector from a tube, which generally will have a circular cross-section. The tube is mechanically formed using a die at a temperature in the range 500 to 550° C. The tube is then cooled to room temperature. The internal size and shape of the tube as mechanically formed corresponds approximately to the internal size and shape that is desired of the connector hoops when they have been shrunk. It should be smaller than the size of the lugs so that there is some unresolved recovery after the hoops have been shrunk onto the lugs. The connector is subjected to a heat treatment by heating it to 525° C. for 10 seconds followed by quenching in cold water. The connector is then finished by a polishing technique such as tumbling, and can then be coated, for example by painting or plating.

The connector is expanded at low temperature, preferably at or below −40° C., and then mechanically stretched while at that low temperature. It can be deformed to about 6% strain. The deformed configuration is retained until the connector is exposed to a temperature above the $A_f$ temperature of the alloy.

The connector will generally be expanded mechanically. The mechanical expansion can be performed using a mandrel. Other expansion techniques which can be used, in combination or independently include use of an expander tool which the connector can be fitted on to, which includes a plurality of arms which can be forced apart. For example, two arms can be mounted for relative pivotal movement around a fulcrum, the arms having handle portions on one side of the fulcrum and expander portions on the opposite side of the fulcrum. Squeezing the handle portions together causes the expander portions to diverge. This tool can provide control over the degree of expansion since expansion is limited by contact of the handle portions. It can also provide a mechanical advantage to facilitate expansion.

The appearance of the shape memory alloy connector can be selected by treatments such as polishing, coating, plating, oxidation treatments, and the like.

In the assembly of the invention, the frame member can be a nose bridge which can extend between a pair of lenses, over the user's nose when the assembly is in use. The frame member can comprise a temple portion. For example, the frame member can be an entire temple, including a part which is intended to extend past the user's ear. It will then generally include a hinge or will be made from a material which is sufficiently flexible for it to be capable of flexing, for example to enable it to fit a user's head accurately or to enable it to be folded for storage. The frame member might comprise just a part of a temple, for example the part which extends from the lens to a hinge or other connector at which the temple arm is connected.

The lens can have just one lug. The lens can be provided with a plurality of lugs, especially two lugs. When a lens has two lugs, they can be positioned on opposite sides, for example to form connections to a nose bridge and to a temple respectively, when the lens is used in a pair of spectacles. When the lens has just one lug, the lug can be positioned for connection to a frame member which itself performs the function of frame components such as temples, nose bridges and nose pads, or is connected to frame components which perform these functions. For example, a lens might be provided with a single lug on its top edge by which it can be connected to a top frame part, which is connected to temples at its ends, and has nose pads depending from it. A lens might have a single lug on its top edge, and a single lug on its inward facing edge for connection to a nose pad.

The lug can be formed as an integral part of the lens, for example by moulding or machining or a combination of processing steps. The lug can be formed separately from the lens and then bonded to it, for example by welding or by use of a separate bonding material such as an adhesive. The lug can be provided so that it extends beyond a line which extends across the lug between the edge of the lens on opposite sides of the lug. The lug can be defined relative to the body of the lens by recesses at its opposite edges in which the connector can be received. The lug can then be positioned so that it is wholly behind a line extending across the lug between the edge of the lens on opposite sides of the lug, or extends beyond that line.

Preferably the edges of the lug which are contacted by the inwardly facing surfaces of the connector hoop are rounded. The lug will generally be elongate when viewed in cross-section so that it has two generally parallel edges which extend approximately parallel to the faces of the lens, and two ends which extend between the parallel edges of the lug. Preferably, those ends of the lug are rounded. Preferably, the length of the lug (the distance by which it protrudes from the lens body, onto which the connector hoop can be fitted) is at least about 0.75 mm, more preferably at least about 1 mm, for example at least about 1.25 mm. Preferably, the thickness of the lug (measured in the same general direction as the thickness of the lens), is at least about 1 mm, more preferably at least about 1.25 mm, for example at least about 1.5 mm. When the lug has a rounded end, it can have a constant radius at that end equal to half of the thickness of the lug at that end. The thickness of the lug will generally be less than the thickness of the lens at the point at which the lug is connected to the lens body. Preferably, for most lenses, the thickness of the lug will approach that of the lens. The height of each lug will be selected to provide torsional stability for the connection between the frame member and the lens. Preferably, the height of the lug is at least about 3 mm, more preferably at least about 4 mm, for example at least about 5 mm.

The lens can be formed from glass. Preferably, the lens will be formed from a polymer material such as is used in the eyeglass lenses, especially a polycarbonate. When the lug is formed separately from the lens, it can be formed from a material which he same as the material of the lens or different from it.

BRIEF DESCRIPTION OF THE DRAWINGS

Embodiments of the present invention will now be described by way of example with reference to the accompanying drawings, in which.

DETAILED DESCRIPTION OF THE INVENTION

Figure 1:
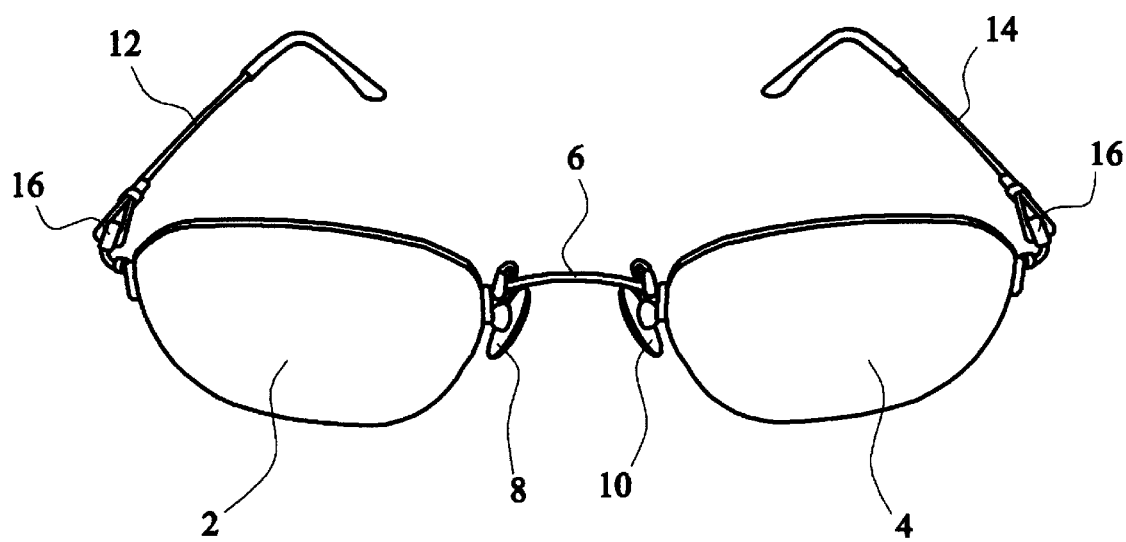
FIG. 1 is an isometric view of a pair of spectacles according to the present invention.

Referring to the drawings, FIG. 1 shows a pair of spectacles which comprises lenses 2, 4, a nose bridge 6 which carries a pair of nose pads 8, 10, and a pair of temples 12, 14. Each of the temples includes a hinge 16 which enables the temples to be folded for storage. The lenses are formed from a polycarbonate material. The connections between the lenses and the ends of the temples and the nose bridge are each made using a connector hoop formed from a shape memory alloy, as described in more detail below. The arm parts of the temples (which extend to and over the user's ears) are formed from a material which has properties which are desired by the frame designer, for example in terms of colour, weight, flexibility and so on. The nose bridge can be formed from the same material as the arm parts of the temples or a different material.

Figure 2:
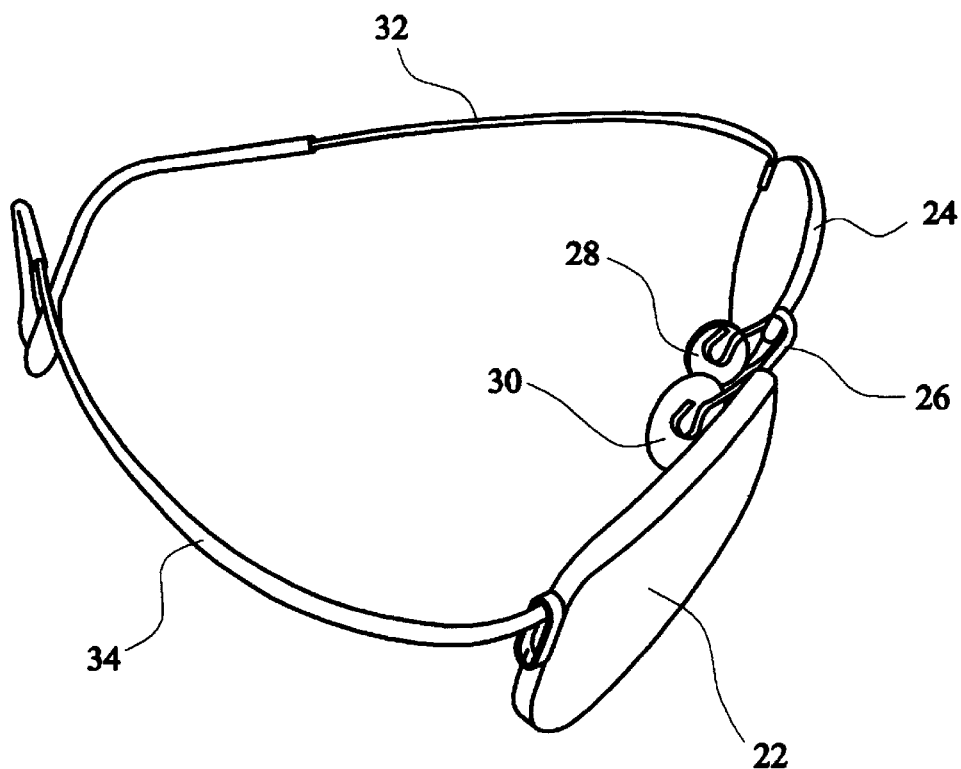
FIG. 2 is an isometric view of another pair of spectacles according to the invention.

The pair of spectacles shown in FIG. 2 comprises lenses 22, 24, a nose bridge 26 which carries a pair of nose pads 28, 30, and a pair of temples 32, 34. Each of the temples is formed from a material which has suitable flexibility to enable the temples to be folded without use of a hinge at or close to where they are connected to the lenses, such as a shape memory alloy which has been treated so that it exhibits enhanced elastic properties. The enhanced elastic properties of shape memory alloys are well known in general, and are discussed in "Engineering Aspects of Shape Memory Alloys", by T W Duerig et al, Butterworth-Heinemann (1990).

Figures 3A, 3B:
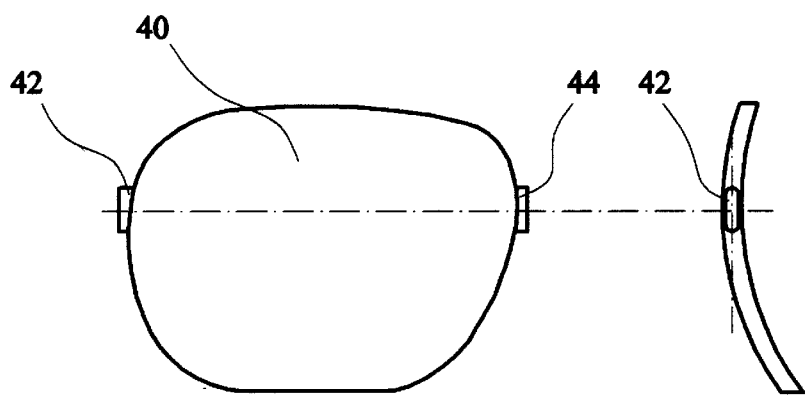
FIG. 3A is a front view of lens which has tabs for fixing a nose bridge and a temple.
FIG. 3B is a side view of the lens shown in FIG. 3A.
Figures 4A, 4B:
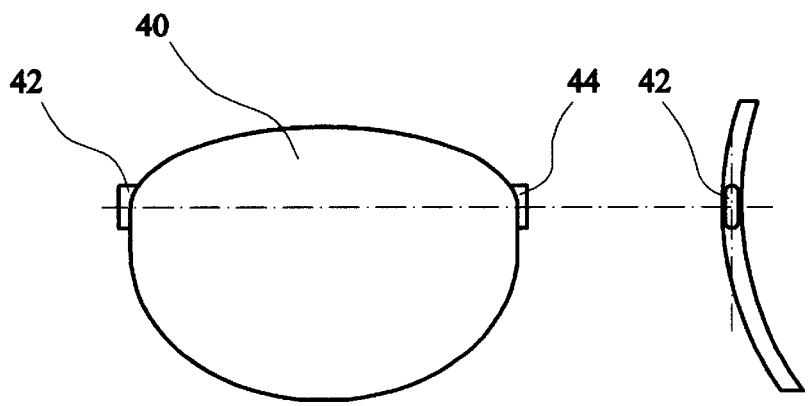
FIG. 4A is a front view of another lens which has tabs for fixing a nose bridge and a temple.
FIG. 4B is a side view of the lens shown in FIG. 4A.

FIGS. 3 and 4 show lenses 40 which have lugs 42, 44 on their opposite sides. The lenses are shaped so that one side edge is directed outwardly, towards the outside of the user's face, and the other side edge is directed inwardly, towards the user's nose. The lug on the outside edge of the lens is intended for attachment of a temple; the lug on the inside edge of the lens is intended for attachment of the nose bridge.

The thickness of each of the lugs is the same as, or slightly less than the thickness of the lens at the root of the lug. For example, the thickness of the lug might be about 1.55 mm. The height of each lug will be selected to provide torsional stability for the connection between the frame member and the lens. For example, the height of the lug might be about 5.3 mm. The length of the lug (the distance by which it protrudes from the lens body, onto which the connector hoop can be fitted) is about 1.27 mm. The positions of the lugs on the lens edges will be selected according to the frame design. For example, the lug for connecting the temples to the frame can be positioned on the top edge of the lens if desired. The lug can have an enlarged portion at its end which is remote from the end body, for example in the form of a partial rim or an outwardly flared portion.

Generally, the lugs will be manufactured with the lens body from a single block of lens material, for example using moulding, cutting and other conventional techniques. however, the lug can be manufactured separately from the lens body and fastened to it, for example by welding or by use of a separate bonding material such as an adhesive.

Figure 5:
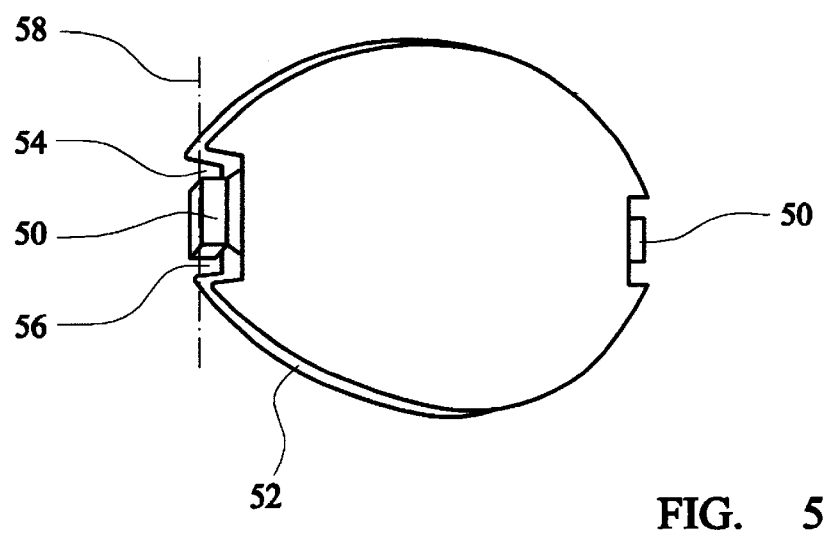
FIG. 5 is an isometric view of a further lens which has recessed lugs.

FIG. 5 shows a lens in which the lugs 50 are located, at least partially, behind the edge 52 of the lens body so that there are recesses 54, 56 between the lug and the body of the lens on each end of the lug in which a connector can be positioned. The lug 50 is positioned so that it is wholly behind a line 58 extending across the lug between the edge 52 of the lens on opposite sides of the lug.

Figure 6:
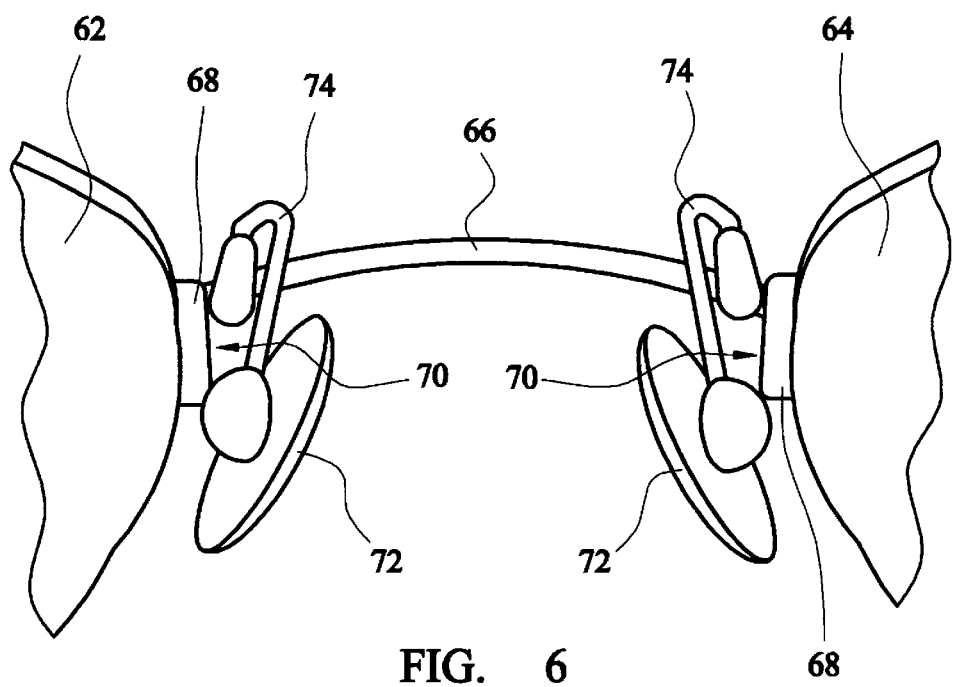
FIG. 6 is an enlarged view of the nose bridge of the pair of spectacles shown in FIG. 1.

FIG. 6 shows a pair of spectacles which comprises lenses 62, 64 which are connected by a nose bridge 66. The nose bridge is provided by a piece of wire which is connected at each end to the lenses by means of connector hoops 68 which are positioned around lugs 70 on the lenses. The connection is achieved by the ends of the nose bridge being received with the lugs 70 within the connector hoops 68. Nose pads 72 are connected to the nose bridge by means of nose pad wires 74 whose ends are fastened to the nose bridge by techniques such as soldering, welding, crimping etc.

The ends of the nose bridge 66 can be connected to the connector hoops 68 before the connector hoops are fastened around the lens lugs. This can facilitate assembly of the spectacles by reducing the number of separate components which have to be manipulated. The ends of the nose bridge can be fastened to the internal circumferential surface of the connector hoops. Alternatively, the ends of the nose bridge can be fastened to the end walls of the connector hoops.

The connector hoops are formed from a tube of the alloy. The tube is mechanically formed using a die at a temperature in the range 500 to 550° C. The tube can be cut to form the individual connector hoops prior to the mechanically forming step. The tube is then cooled to room temperature. The internal size and shape of the tube as mechanically formed corresponds approximately to the internal size and shape that is desired of the connector hoops when they have been shrunk. It should be smaller than the size of the lugs so that there is some unresolved recovery after the hoops have been shrunk onto the lugs. The connector is subjected to a heat treatment by heating it to 525° C. for 10 seconds followed by quenching in cold water. The connector is then finished by a polishing technique such as tumbling, and can then be coated, for example by painting or plating.

Figure 7:
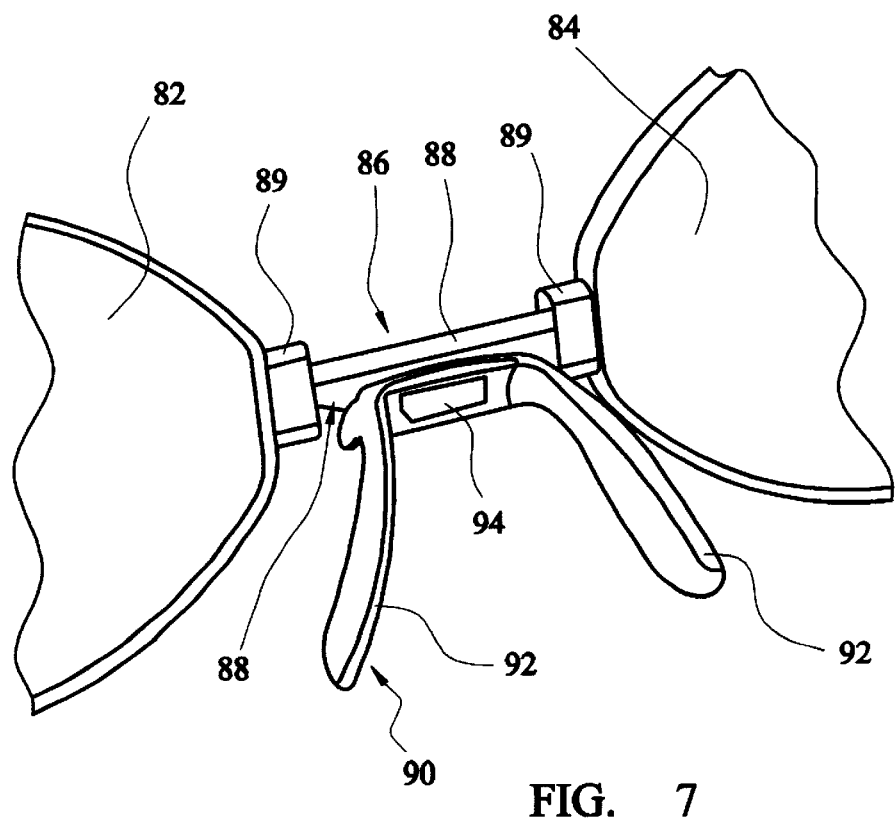
FIG. 7 is an isometric view of another embodiment of nose bridge.

FIG. 7 shows a pair of spectacles which comprises lenses 82, 84 which are connected by a nose bridge 86. The nose bridge is formed from a tube of a nickel titanium alloy which contains 50.5 at. % nickel. The tube has openings 88 formed in its side walls in a central region, leaving circumferentially continuous hoop 89 at each end. The central region of the tube with its openings and the connector portions in the end regions is subjected to the forming, heat treatment, and expansion steps described above. The forming can therefore result in an increase in the internal size of the central region of the tube, so that that region of the tube will shrink inwardly when the tube transforms from the martensite phase to the austenite phase.

The nose bridge includes a nose support 90 which is formed from a suitable polymeric material by moulding. The nose support comprises a pair of nose pads 92 and a connector plug 94. The connector plug can fit within the tubular nose bridge 86 through one of the openings 88 in its side wall. When the nose bridge is heated to cause it to shrink, the plug is engaged by the side wall and retained within it. In this way, the nose support is fastened to the nose bridge.

Figure 8:
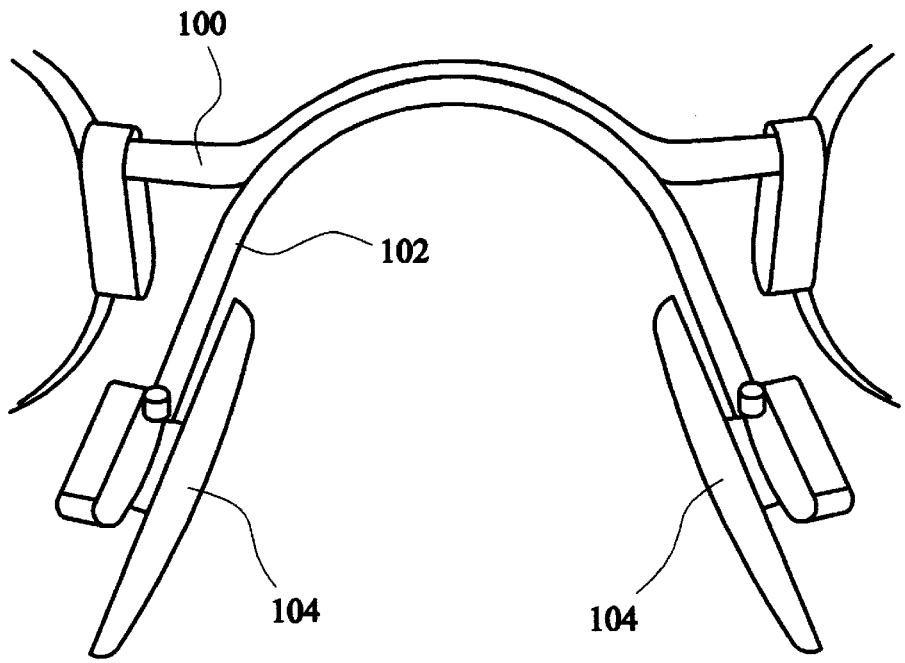
FIG. 8 is a front view of a further embodiment of nose bridge.

FIG. 8 shows a nose bridge 100 which is provided by a piece of wire similar to that shown in FIG. 6. A nose support 102 is provided by a length of wire of similar cross-section to the nose bridge, which is fastened to the nose bridge by a technique such as welding, or using a bonding material such as an adhesive or by soldering. The nose support includes nose pads 104 at its ends.

Figure 9:
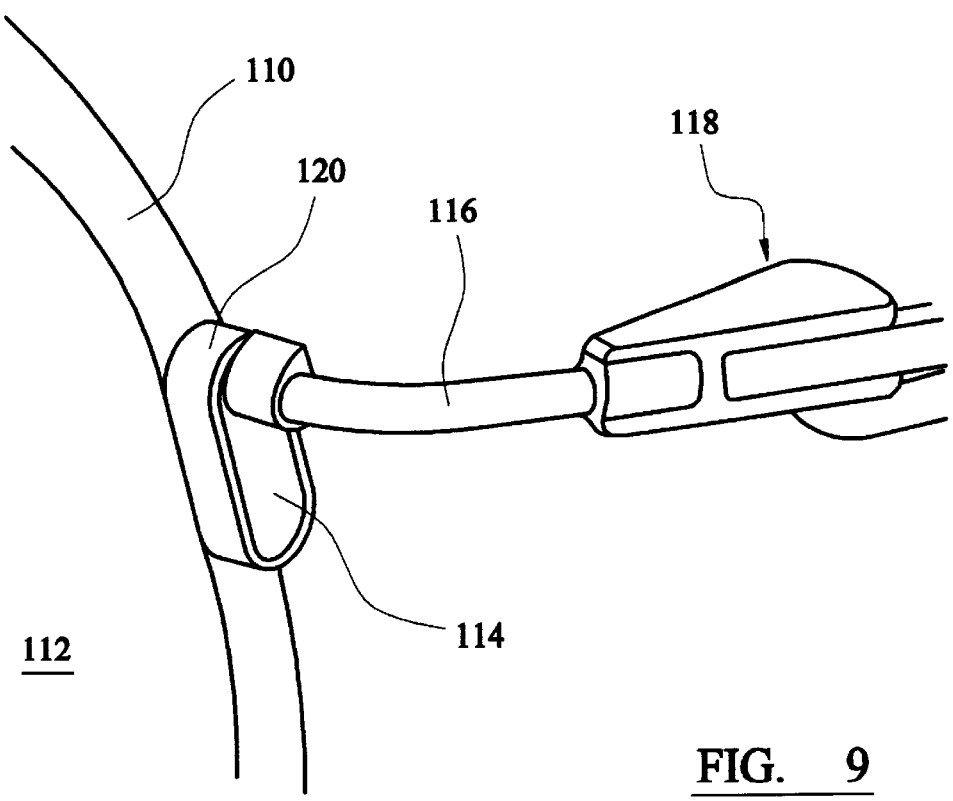
FIG. 9 is an isometric view of the pair of spectacles shown in FIG. 1, showing the connection between the temple and the lens.

FIG. 9 shows the edge 110 of a lens 112 with a lug 114 that is used to fasten a temple to the lens. The temple comprises a hinge portion 116 and an arm portion which is connected to the hinge portion at a hinge 118. The hinge and arm portions of the temple are provided by a wire, which is similar to that which provides the nose bridge in the embodiments shown in FIGS. 6 and 8. The hinge portion 116 of the temple is connected to the lens by means of a connector hoop 120 which is similar to the connector loops shown in other drawings.

Figure 10:
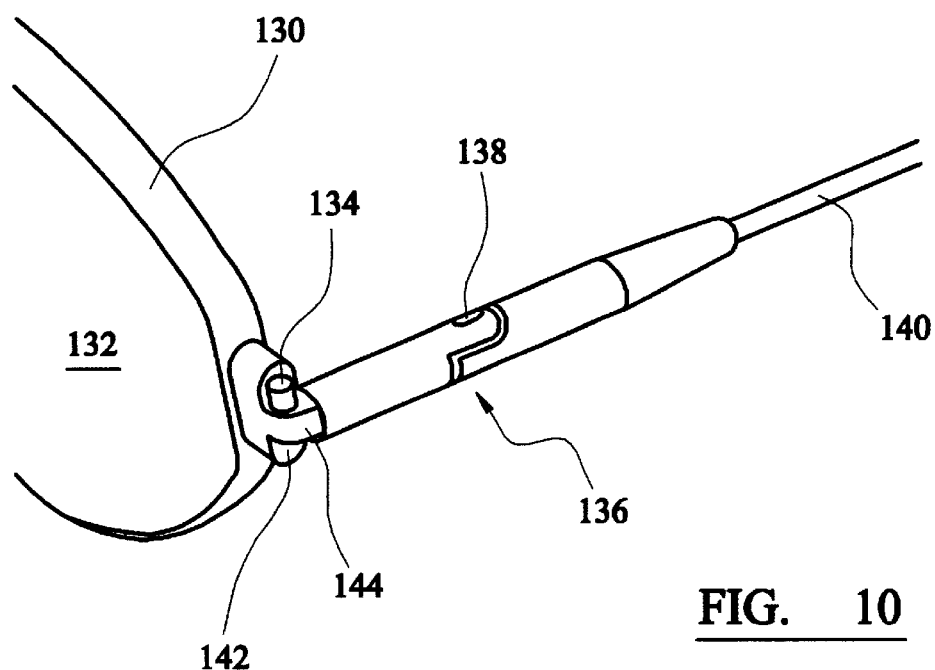
FIG. 10 is an isometric view of another pair of spectacles showing the connection between the temple and the lens.

FIG. 10 shows the edge 130 of a lens 132 with a lug 134 that is used to fasten a temple 136 to the lens. The temple includes a hinge 138 at which an arm portion 140 of the temple is connected. The temple is fastened to the lens lug by means of a connector hoop 142. The connector loop is fastened to the hinge by means of thin webs 144 of the shape memory alloy which are formed with the connector loop from a tube of the shape memory alloy.

Figure 11:
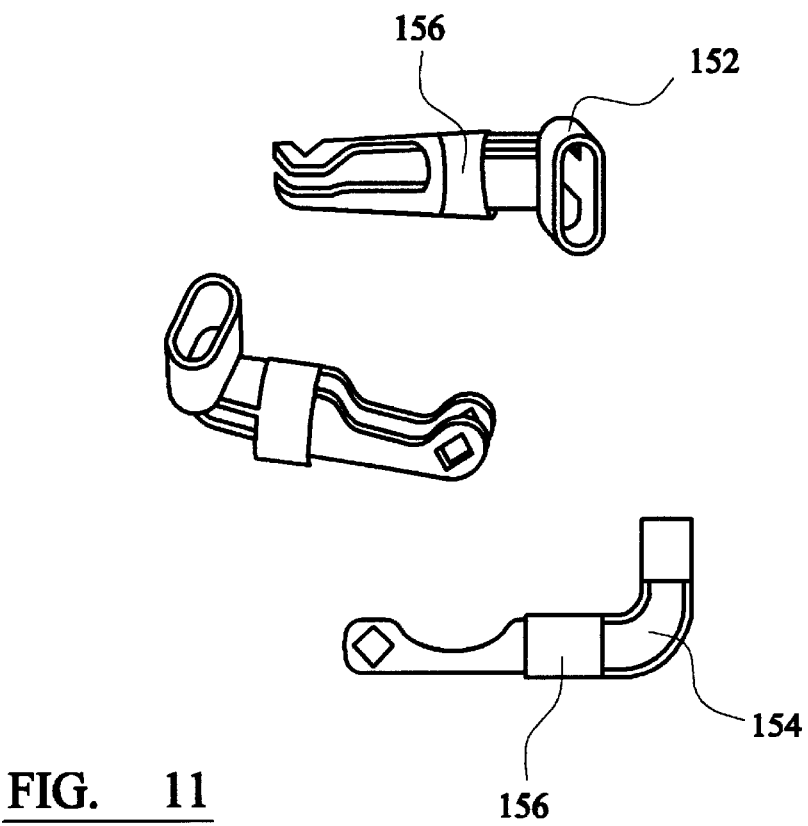
FIG. 11 shows views of the connector which is used to connect the temple to the lens in the embodiment shown in FIG. 10.

Views of another form of connector in its recovered (shrunk) configuration are shown in FIG. 11. The hinge includes a connector loop 152 which is formed from a tube of a shape memory alloy. Openings 154 are formed in the sidewalls of the tube, and a continuous loop 156 at the end of the tube remote from the connector loop 152 which fits on to the lens lug is used to fasten the connector to a hinge. The portion of the tube which has openings in the side walls is bent through 90°.

Figure 12:
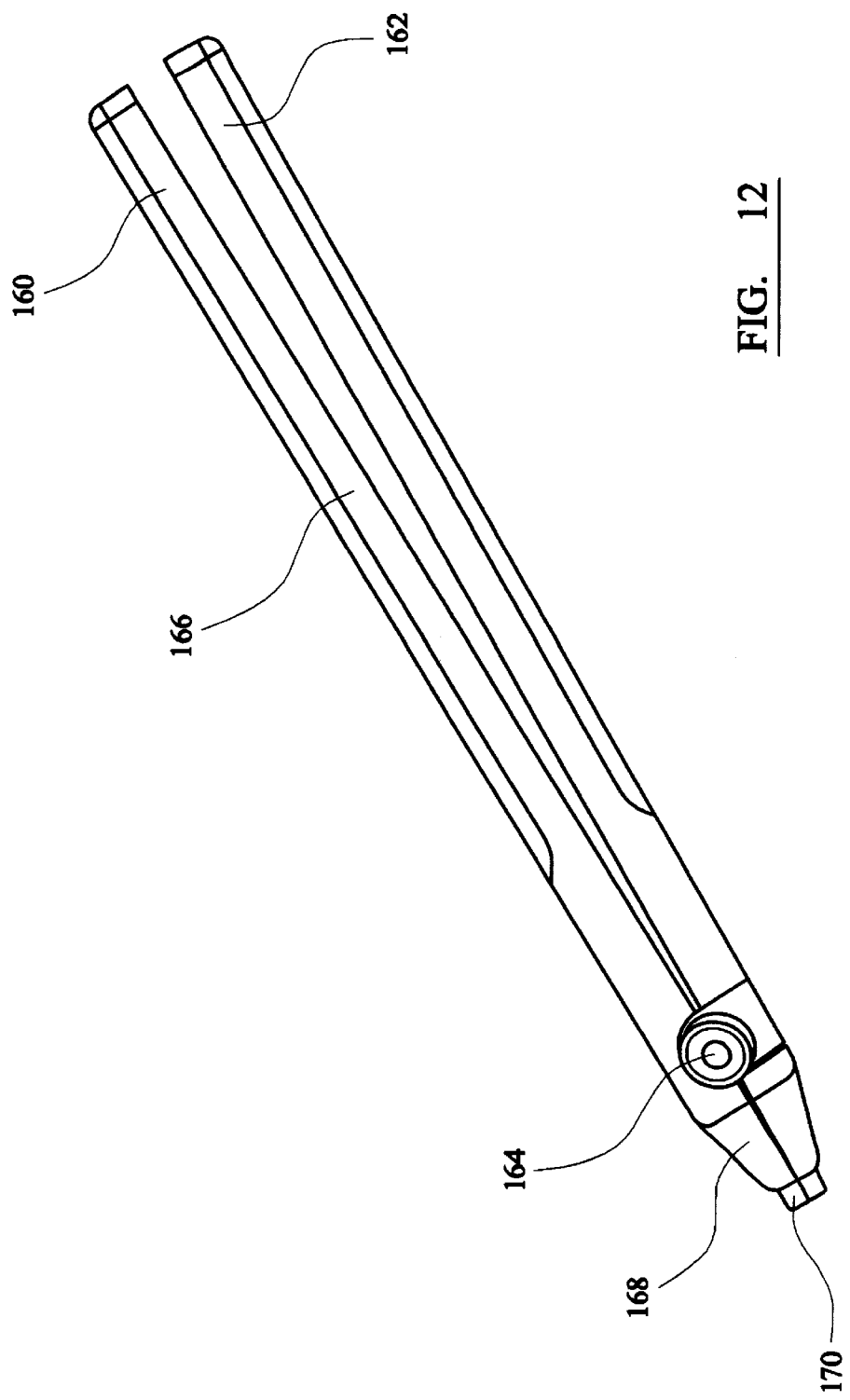
FIG. 12 is a view from above of a tool which can be used to expand a connector hoop.

FIG. 12 shows an instrument which can be used to expand a connector loop while the alloy is in its martensite phase, in the expansion stage of the manufacturing process. The instrument comprises first and second bars 160, 162 which are arranged to pivot around a fulcrum pin 164. The first bar 160 has a handle portion 166 and an expander portion 168 on the opposite side of the fulcrum pin. The second bar 162 has similar portions. Each of the expander portions has a profiled end 170 at its end on which a connector loop can be positioned for expansion. The instrument can be used by squeezing the handle portions of the bars together. As they are so squeezed, the expander portions are forced apart. Movement apart of the expander portions (and therefore the degree of expansion of the connector loop) is limited by the handle portions coming into contact with one another.

What is claimed is:

1. An eyeglass assembly which comprises a lens and a frame member, in which the lens has a lug at one edge, and which includes a connector by which the frame member is fastened to the lug, the connector comprising a hoop formed from a shape memory alloy which has (a) been treated so that the hoop shrinks inwardly when it is heated to a temperature at which the alloy transforms from martensite phase to austenite phase, and (b) been exposed to an increase in temperature so that the phase of the alloy changes from the martensite phase to the austenite phase and so that the connector hoop shrinks inwardly to grip the lens lug.

2. An assembly as claimed in claim 1, in which the frame member and the connector are connected to one another before the connector hoop is made to shrink inwardly.

3. An assembly as claimed in claim 1, in which the frame member is formed from a piece of tube.

4. An assembly as claimed in claim 3, in which the connector hoop is provided by an end portion of the tube.

5. An assembly as claimed in claim 3, which includes a reinforcing insert for location within the tube of the frame member to reinforce it against bending.

6. An assembly as claimed in claim 3, in which the wall of the frame member has openings formed in it.

7. An assembly as claimed in claim 1, in which the connector and the frame member are provided as separate components, and in which the frame member and the lug on the lens are fastened together by locating them within the connector hoop before it is heated to cause it to shrink inwardly.

8. An assembly as claimed in claim 1, in which a transverse dimension of the lug is larger towards its free end compared with that dimension at a point between the free end and the lens body.

9. An assembly as claimed in claim 1, in which the frame member comprises a nose bridge.

10. An assembly as claimed in claim 1, in which the frame member comprises a temple portion.

11. An assembly as claimed in claim 10, in which the temple portion comprises a part of a temple hinge.

12. An assembly as claimed in claim 1, in which the lug is formed as an integral part of the lens.

13. An assembly as claimed in claim 1, in which the lug is formed separately from the lens and is bonded to it.

14. A method of assembling an eyeglass which comprises a frame member and a lens in which the lens has a lug at an edge thereof and in which the frame member is fastened to the lens by means of a connector which comprises a hoop formed from a shape memory alloy which has been treated so that the hoop shrinks inwardly when it is heated to a temperature at which the alloy transforms from martensite phase to austenite phase, in which the method comprises the steps of:

a. positioning the connector in relation to the lens lug so that the lug is located within the connector hoop, and b. causing the temperature of the alloy to increase so that the phase of the alloy changes from the martensite phase to the austenite phase and so that the connector hoop shrinks inwardly to grip the lug.

* * * * *